Dec. 14, 1937.     H. N. WAGAR     2,102,141
BATTERY CHARGING SYSTEM
Filed March 23, 1935
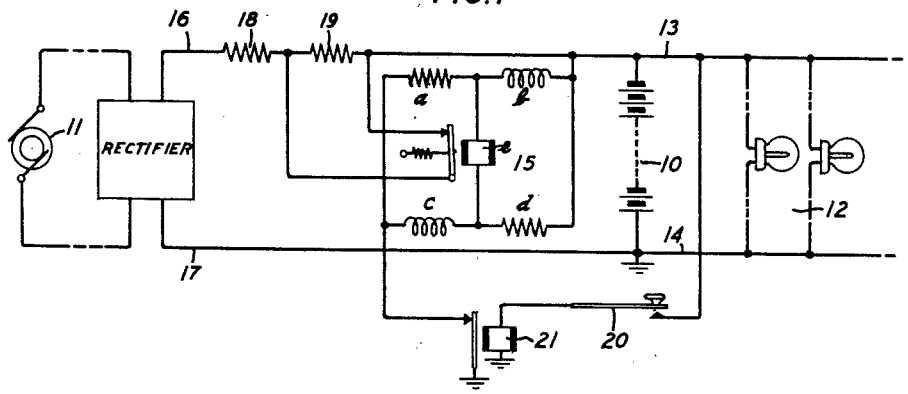
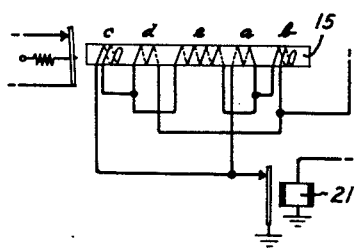
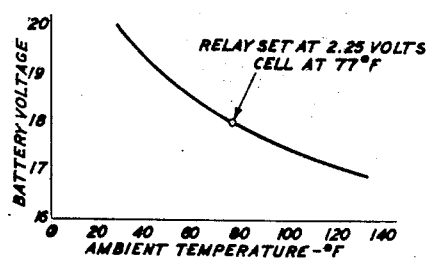
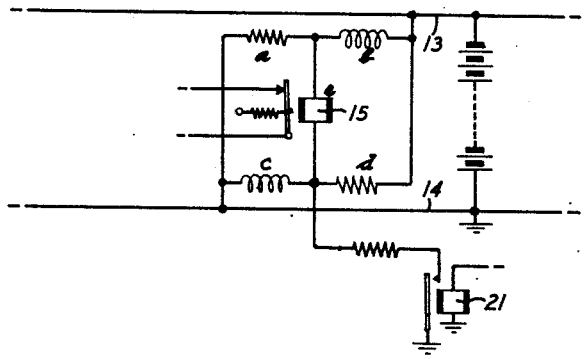
INVENTOR
H. N. WAGAR
BY
ATTORNEY Patented Dec. 14, 1937

2,102,141

UNITED STATES PATENT OFFICE 2,102,141

BATTERY CHARGING SYSTEM

Harold N. Wagar, New York, N. Y., assignor to Bell Telephone Laboratories, Incorporated, New York, N. Y., a corporation of New York Application March 23, 1935, Serial No. 12,576

4 Claims. (Cl. 171—314)

This invention relates to switching means for automatically controlling the charging of storage batteries and particularly to means for controlling the charging of storage batteries in accordance with variable temperature conditions.

In accordance with well-known practice, storage batteries are charged from a suitable power source at either of two charging rates depending upon the battery voltage, the charge being reduced from a high rate to a lower rate at a certain predetermined battery voltage which is hereinafter termed the cut-off voltage.

Charging of storage batteries is accompanied by chemical activity which reaches a definite stage when the battery is fully charged. Any overcharging of the battery after this stage of chemical activity is reached, increases the activity to such an extent that the lead constituent of the battery is attacked and caused to deteriorate. Such deterioration decreases the life of the battery.

Chemical activity within the battery is known to be influenced by temperature. That is, the chemical activity increases as the ambient temperature increases and is reduced as the temperature falls. It, therefore, follows that to preserve the life of a battery, the cut-off voltage or that voltage of a battery at which the charging rate is reduced to preclude the possibility of excessive chemical activity should be regulated in accordance with temperature variations.

It is the object of this invention to provide, in a battery charging system, switching facilities which function automatically at different battery voltages for different temperature conditions to regulate the battery charging rate accordingly.

This object is attained in accordance with a feature of the invention by the provision of a network type control relay, in a charging system, which operates at different battery voltages as the ambient temperature varies to regulate the battery charging rate.

Another feature of the invention resides in the use of a normally unbalanced Wheatstone bridge circuit arrangement as the network and in which the control relay coil constitutes the galvanometer arm and in which the pairs of opposite arms are constituted of materials having different temperature-resistance coefficients whereby the unbalanced condition of the bridge circuit varies with temperature changes.

A further feature of the invention provides for the winding of the plurality of coils which comprise the Wheatstone bridge circuit on the core of the control relay.

These and other features of the invention will be readily understood from the following detailed description made with reference to the accompanying drawing, in which:

Fig. 1 is a circuit diagram showing a battery charging system embodying the features of this invention;

Fig. 2 shows one method of connecting the various windings of the network and mounting them on a single core;

Fig. 3 shows a desirable voltage-temperature characteristic which is obtained by utilizing the network relay of this invention as the control relay in the system shown in Fig. 1; and Fig. 4 shows an alternative arrangement for resetting the control relay of this invention.

In Fig. 1, the numeral 10 identifies a storage battery which supplies current to a load 12 by way of the conductors 13 and 14. Current for charging the storage battery 10 is supplied by any suitable charging source 11 by way of conductors 16 and 17. Included in conductor 16 and interposed between the charging source 11 and battery 10 are two resistors 18 and 19 which constitute means by which the charging rate to the battery 10 may be regulated.

At 15 there is shown a network relay which is bridged across the battery terminals by way of the back contact and armature of relay 21. Relay 15 comprises a single core upon which are wound the windings $a$, $b$, $c$, $d$ and $e$, all of which are so interconnected as to form a Wheatstone bridge circuit, of which the relay operating coil $e$ constitutes the galvanometer arm. The opposite arms $a$ and $d$ are of such material as to have low or zero temperature-resistance coefficients, whereas the arms $b$ and $c$ which may be of copper wire, have appreciable temperature-resistance coefficients. The normal resistances of the windings $a$, $b$, $c$ and $d$ are so proportioned as to maintain an unbalanced bridge condition. The coil $e$, therefore, will always be traversed by a current when the network is connected across the battery terminals and the value of this current will vary as the unbalanced condition of the bridge circuit varies. The degree of unbalance will be altered for any change in the resistance of the arms $b$ and $c$ which change is effected by changes in the ambient temperature, it being understood that the resistance of the arms $a$ and $d$ is substantially unaffected by temperature variations. The resistance values of arms $b$ and $c$ are chosen to be higher than the resistance values of arms $a$ and $d$ so that an increase in temperature will increase the resistance of arms $b$ and $c$ and thereby further increase the unbalance of the bridge circuit, resulting in an increase in current in the arm e. Correspondingly, a decrease in temperature will reduce the unbalance of the bridge circuit thus reducing the current in arm e.

It has been found that at a normal ambient temperature of 77° F., the desirable voltage at which the relay 15 should function to prevent an overcharge of the battery 10 is 2.25 volts per cell or 18 volts, assuming an eight-cell battery. As the chemical activity increases with temperature, it is necessary that relay 15 functions at a voltage lower than 18 volts for any increase in the ambient temperature above 77° F. Conversely, it is necessary that relay 15 responds to voltages above 18 volts for any decrease in the ambient temperature to insure a fully charged battery.

It is believed that the manner in which the system of this invention compensates for such temperature variations will be best understood from the following detailed description of the circuit shown in Fig. 1.

Under a normal temperature of 77° F. the armature of relay 15 is so adjusted mechanically, as by a definite spring tension, that it will operate at all voltages above 18 volts but not at voltages below this value. This may be termed the marginal operating voltage corresponding to a temperature of 77° F. The value of the mechanical force on the armature which must be overcome by the magnetic attraction of the relay 15 will correspond to a definite value of the bridge unbalance current flowing in the coil e and will not be influenced by the currents flowing in the other arms a, b, c and d, since these arms are so wound as to be either ineffective magnetically or balance one another out. This value of current will be referred to as the marginal operating current.

Under the above condition and with the terminal voltage of the battery 10 below 18 volts, the current in coil e will be below the marginal operating value and relay 15 will not operate, causing the battery 10 to be charged at a high rate since the resistor 19 is short-circuited by the armature and back contact of control relay 15. As soon as the battery voltage reaches 18 volts, the current in coil e reaches the value which will cause the armature to be attracted and remove the short circuit from resistor 19 which is then effectively included in the charging circuit in series with resistor 18 so that the battery 10 charges at a low rate. The low rate of charge is adjusted to be just sufficient to make up for the internal losses in the battery and for the energy consumed in the control circuit.

Should the ambient temperature exceed the normal value of 77° F., the resistance of the coils b and c will increase proportionately with the result that the unbalanced condition of the network is increased and the current traversing coil e increased accordingly. Consequently, the terminal voltage required to produce the marginal operating current in coil e will be less than the 18 volts previously needed and relay 15 will become capable of operating on a lower voltage, which decreases in value as the temperature increases. It will be observed, by reference to Fig. 3, that should the ambient temperature rise, for example, to 100° F., relay 15 will operate at 2.19 volts per cell or 17.5 volts for an eight-cell battery.

In like manner, for any fall in temperature, the current in coil e will diminish due to the decrease in the resistances of the network arms b and c, with the result that a greater battery voltage is required to produce the marginal operating current in the coil e. As indicated by the curve shown in Fig. 3, at an ambient temperature of 50° F. relay 15 will not operate until the battery voltage reaches 18.8 volts.

Relays of the type described, as well as other types used for the same purpose, will operate accurately at a prescribed voltage but are known to remain operated even when the voltage falls considerably below the prescribed operating value. In order to insure the proper setting of the control relay of this invention there is shown relay 21 which is included in the battery load and is adapted to be operated by the closure of key 20. The key 20 may be any switching mechanism which operates incidental to the closure of a battery load circuit. Should relay 15 operate on a battery voltage of, for example, 18 volts, and the battery voltage then falls to 17.9 volts or some lower value, relay 15 may tend to stick and remain operated which would result in the battery being charged at the low rate when it should be charging at the higher rate. The provision of means, such as a relay 21, which may be momentarily operated at intervals by the actuation of a switching device such as key 20, insures the opening of the control relay circuit so that relay 15 will restore and remain released even though relay 21 is immediately de-energized, provided the battery voltage is below the predetermined cut-off value. If relay 21 is momentarily operated at a time when the terminal voltage of the battery is greater than the cut-off value, the circuit for relay 15 would be opened as before and the relay would release its armature. However, as soon as the control relay circuit is again closed upon the release of relay 21, relay 15 would reoperate to maintain the low charging rate to the battery.

An alternative means of accomplishing this same object which comes within the scope of the present invention is through the substitution of a ground connection to be made through a resistance to the junction of the terminals of windings c, d and e, or of a, b and e. The proper choice of this resistance will result in no current flowing in the operating coil e and the armature will release. Such an arrangement is shown in Fig. 4.

The windings of relay 15 may be wound on the relay core in various ways with respect to each other. Whether the several windings are inductively or non-inductively wound and connected in parallel aiding or parallel opposing will determine the slope of the temperature-voltage curve shown in Fig. 3. To obtain the greatest efficiency from a temperature sensitivity viewpoint, the operating coil e should be wound next to the core from which it receives heat by conduction; the zero temperature resistance coefficient windings a and d are then wrapped over winding e and finally, the windings b and c are wound on the outside to receive heat from the surrounding air by convection and conduction.

What is claimed is:

1. In a battery charging system, a battery, a source of current for charging said battery and means including a multi-winding relay for regulating the charging rate to said battery, said relay normally carrying, by way of one of its windings, a current of insufficient magnitude to cause its operation and the other windings constituting the four arms of a Wheatstone bridge circuit, certain thereof having positive temperature-resistance coefficients for causing the normal current carried by said one winding to vary coincidently with temperature variations.

2. In combination, a battery subject to temperature variations, a source of current for charging said battery, means including a relay which operates at a particular value of battery voltage at a predetermined ambient temperature to which the battery is subject to alter the charging rate to the battery and a Wheatstone bridge circuit of which the operating winding of said relay constitutes a part and which includes temperature responsive means which function to cause the operating voltage for said relay to vary coincidently with temperature variations from the predetermined ambient temperature to which the battery is subject.

3. In combination, a battery subject to temperature variations, a source of current for charging said battery, means including a relay which operates at a particular value of battery voltage at a predetermined ambient temperature to which the battery is subject to alter the charging rate to the battery and a Wheatstone bridge circuit of which the operating winding of said relay constitutes a part and two opposite arms of which include material having an appreciable temperature resistance coefficient which function to cause the operating voltage for said relay to vary coincidently with variations from the predetermined ambient temperature to which the battery is subject.

4. In combination, a battery subject to temperature variations, a source of current for charging said battery, means including a relay which operates at a particular value of battery voltage at a predetermined ambient temperature to which the battery is subject, to alter the charging rate to the battery and a Wheatstone bridge circuit of which the operating coil of said relay constitutes a part, two opposite arms of which include material having an appreciable temperature resistance coefficient and the other two arms having a substantially zero temperature resistance coefficient, which functions to cause the operating voltage for said relay to vary coincidently with variations from the predetermined ambient temperature to which the battery is subject.

HAROLD N. WAGAR.